July 23, 1940.　　　　P. W. DILLON　　　　2,209,153
APPARATUS FOR TREATING METALS
Filed Sept. 2, 1938　　　3 Sheets-Sheet 1
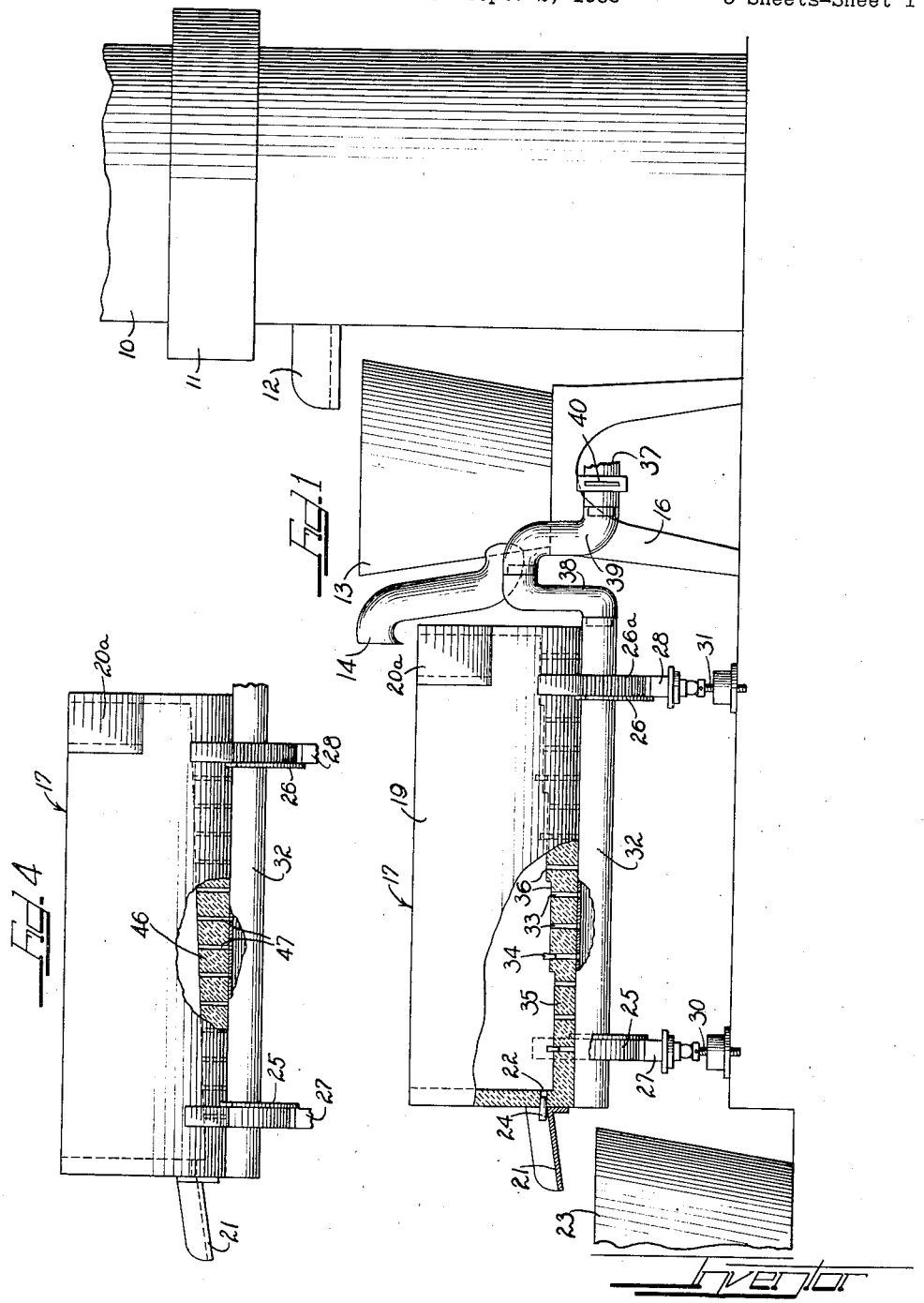
Inventor
PAUL W. DILLON
by Charles Still
Attys.

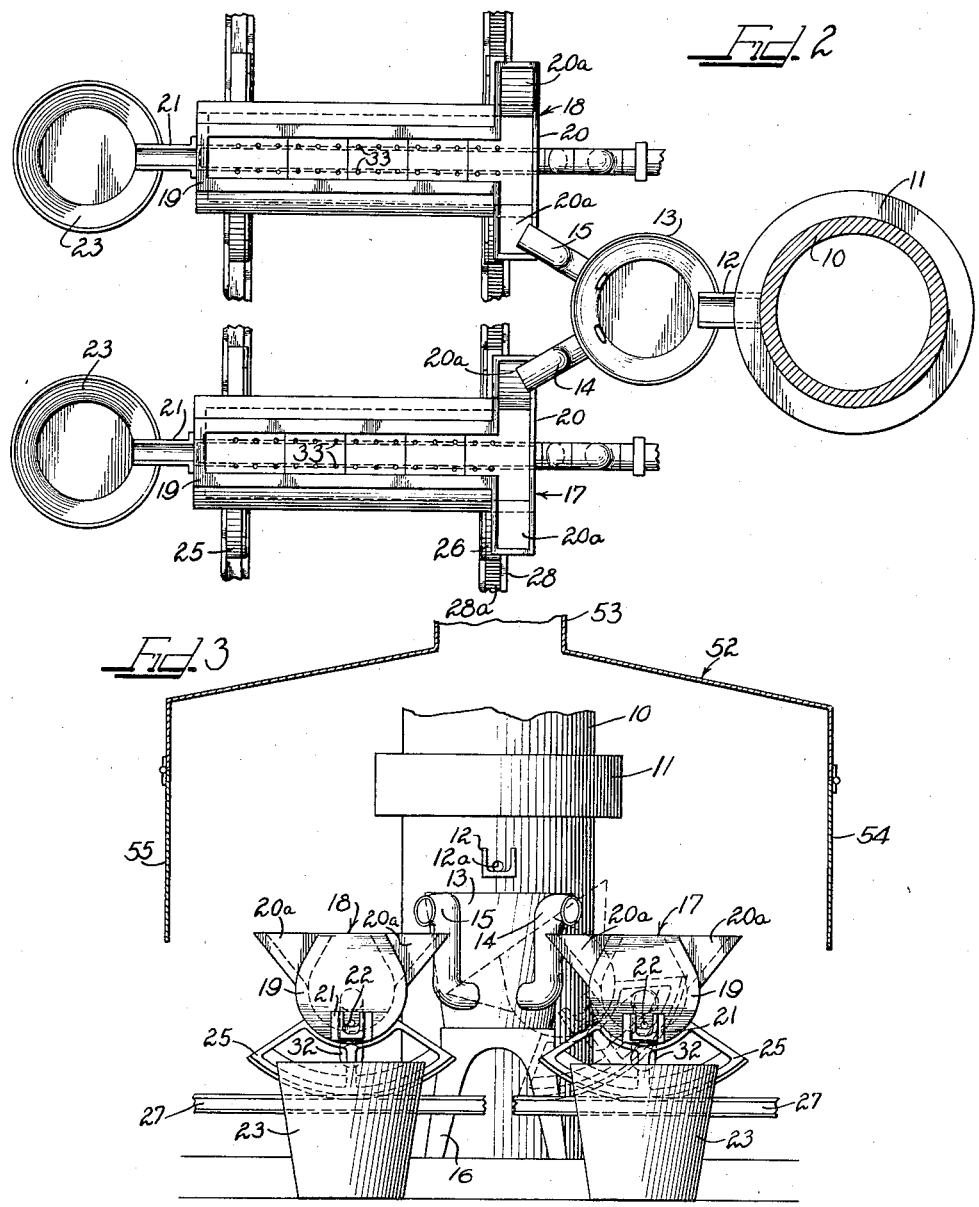

July 23, 1940.  P. W. DILLON  2,209,153
APPARATUS FOR TREATING METALS
Filed Sept. 2, 1938   3 Sheets-Sheet 3
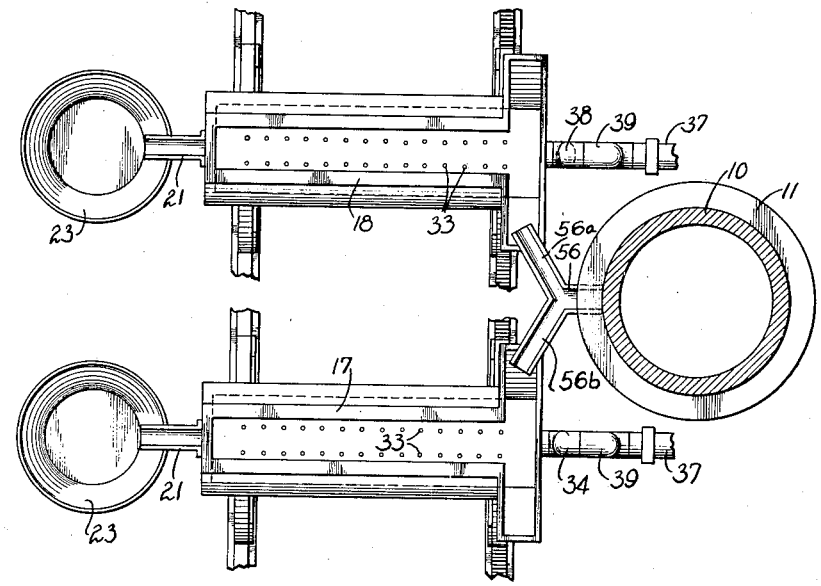
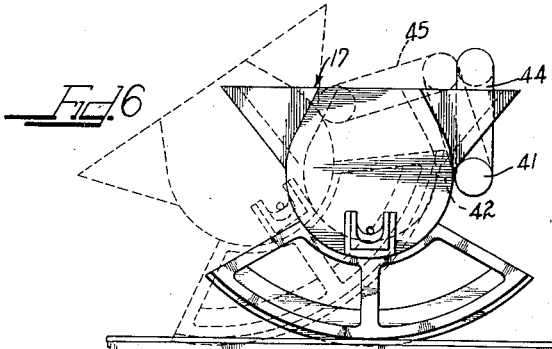
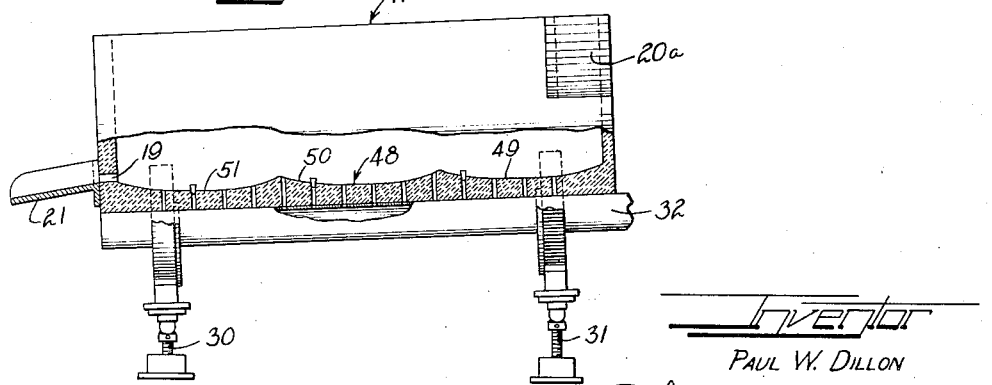
Inventor
PAUL W. DILLON Patented July 23, 1940

2,209,153

UNITED STATES PATENT OFFICE 2,209,153

APPARATUS FOR TREATING METALS

Paul W. Dillon, Sterling, Ill., assignor to Northwestern Steel and Wire Company, Sterling, Ill., a corporation of Illinois Application September 2, 1938, Serial No. 228,084

10 Claims. (Cl. 266—36)

This invention relates to the treatment of molten metals as they flow along a passageway or spout and includes an elongated converting apparatus for treating the flowing molten metals.

More specifically this invention relates to apparatus for Bessemerizing molten iron as it flows from a melting furnace.

It has been customary in the production of steel to tap a melting furnace such as a blast furnace and allow the molten metal to run into a ladle. The ladle charge is then dumped into a mixer where the charges from several melting furnaces can be stored in a molten state. When a Bessemer converter is available for receiving a charge, the mixer is tapped to load a ladle and the loaded ladle is then moved to a point adjacent the Bessemer converter where it can be dumped into the converter. After the blow in the Bessemer converter, the metal is dumped out of the converter into a ladle for making Bessemer steel or for subsequent charging into an open hearth furnace, an electric furnace, or the like apparatus.

This practice involves numerous handling steps and, at best, is a batch process.

According to the present invention there is now provided apparatus for treating molten metal as it is poured from a melting furnace.

In one modification of the invention the molten metal tapped from the melting furnace flows into a desulphurizing ladle where it is treated with a suitable desulphurizing agent such as sodium hydroxide, soda ash, or the like. The metal, however, flows continuously through this ladle and slag accumulated on top of the metal in the ladle is skimmed off. The metal flows from the ladle into an elongated spout-like converter.

As the metal flows through the spout-like converter, it is subjected to an air blast or a series of air blasts to effect the oxidation of undesired ingredients such as carbon, manganese and silicon.

The metal flowing from the spout-like converter can be directly cast as Bessemer steel, or can be charged into a basic open-hearth furnace or an electric furnace for the production of duplex or triplex processed steel.

In another modification of the invention the metal is poured directly from the melting furnace into the spout-like converter.

It is evident from the above brief description of the invention that the process is continuous and that many of the heretofore necessary handling steps have been eliminated.

It is therefore an object of this invention to provide apparatus for treating molten metal as it flows from a melting furnace.

Another object of the invention is to provide a spout-like converter for treating metal flowing therethrough.

A further object of the invention is to subject molten metal to a series of refining operations as the metal flows along a path or a series of wells.

Another object of the invention is to eliminate heretofore necessary handling steps in the refining of molten metals.

A further object of the invention is to continuously desulphurize and decarburize molten iron or steel as it is tapped from a melting furnace.

A specific object of the invention is to provide a Bessemer converter capable of acting upon metal continuously flowing therethrough.

Other and further objects of the invention will become apparent to those skilled in the art from the following detailed description of the annexed sheets of drawings which form a part of this specification.

On the drawings:

Figure 1 is a fragmentary side elevational view, with a part broken away and shown in vertical cross section, of metal refining apparatus according to this invention.

Figure 2 is a top plan view of the apparatus shown in Figure 1 with a part thereof shown in horizontal cross section.

Figure 3 is a front elevational view of the apparatus shown in Figures 1 and 2, with part of the apparatus broken away.

Figure 4 is a side elevational view, with a part broken away and shown in vertical cross section, of a modified type of converter forming part of the apparatus of this invention.

Figure 5 is a top plan view, with a part shown in horizontal cross section, of a modified form of treating apparatus according to this invention.

Figure 6 is a front elevational view of a side blow type of converter according to this invention.

Figure 7 is a side elevational view, with a part broken away and shown in vertical cross section, of another modified form of converter according to this invention.

As shown on the drawings:

In Figures 1 to 3 inclusive, the reference numeral 10 designates a melting furnace such as a cupola or blast furnace. The melting furnace can receive either scrap metal or ore. As is customary in metal furnaces, a tuyère header 11 supplies the tuyères (not shown) with air to be blown into the furnace.

The furnace 10 has a tap spout 12 projecting therefrom beneath the tuyère header 11. The spout 12 is fed from a tap hole 12a through the furnace (Figure 3) for drainage of molten metal from the furnace.

A desulphurizing ladle 13 is mounted in front of the spout 12 and is provided with a pair of teapot type discharge spouts 14 and 15. The spouts 14 and 15 discharge metal from the bottom portion of the ladle 13 so as to prevent a direct flow of metal across the top of the ladle into the subsequent apparatus. Obviously the ladle could be provided with a baffle extending from the top thereof into spaced relation from the bottom thereof and positioned between the ladle inlet and outlet to require a flowing of the metal down into the ladle before it is discharged from the ladle. A baffle of this type could replace the spouts 14 and 15 and ordinary overflow lips could then be used.

The ladle 13 may be mounted on a stand or support 16.

A pair of converters 17 and 18 are mounted in spaced parallel relation in front of the desulphurizing ladle 13 and are adapted to receive molten metal from the spouts 14 and 15.

Each converter 17 and 18 comprises a pear-shaped body portion 19 open at the top thereof.

The rear ends of the body members 19 are provided with a transverse open-topped trough 20 communicating with the interior of the body member. These troughs 20 define wings 20a projecting beyond the sides of the body member 19. The inner wings 20a are disposed under the spouts 14 and 15 when the converters are in upright position and are adapted to receive metal from the spouts for supplying the converter body with molten metal. These wing members and transverse passageways are desirable to permit registration of the spouts with the interiors of the converters in any tilted position of the converters. At the same time the open tops of the body portions 19 of the converters can be relatively small so as to confine the blasts issuing therefrom. The front ends of the body members 19 are provided with discharge spouts 21 for directing molten metal flowing through the tap holes 22 into ladles 23. The tap holes 22 can be closed by means of plugs such as 24 (Figure 1).

The converters 17 and 18 are each mounted on a pair of rockers 25 and 26.

The rockers are supported on tracks 27 and 28. At least one rocker and one track of each pair, such as the rear rockers 26 and tracks 28, are provided with meshing gear teeth 26a and 28a, respectively, to rotate the converters into tilted, charging or discharging position. For example the tracks 28 can operate as racks for rocking the rockers 26 to move the converters into the tilted position shown in dotted lines in Figure 3. In this tilted position the spout 14 can fill the empty converter 17 and the metal will flow into the belly of the converter away from the blast holes in the bottom of the converter as will be hereinafter more fully explained.

One or both of the tracks 27 and 28 can be mounted on jacks such as 30 and 31 (Figure 1) to place the converters at a desired incline for controlling the rate of flow of metal through the converters.

Wind boxes or pipes defined by a bottom plate 32 are mounted under the bottoms of the converters 17 and 18 and communicate with the interiors of the converters through tuyères 33 (Figures 1 and 2). These tuyères or blast holes 33 are arranged in any number of series along the lengths of the converters at the bottoms thereof and supply jets of air that pass through the molten metal flowing through the converters when the converters are in upright position. The desired amount of flow in any particular section of the converters can be controlled by plugging off some of the tuyères 33 by means of plugs such as 34 (Figure 1), or by removing the bottom plate 32 and blanking off any of the tuyères 33 in the customary manner. It should be understood, however, that separate valve controls can be provided.

As best shown in Figure 1, the converters such as 17 are lined with a highly refractory material 35 such as ganister rock, firestone or mica. Fire clay is used to hold the rock bricks together. The lining 35 shown in Figure 1 is formed in steps such as 36 descending toward the discharge port 22. This step arrangement of the lining forms a descending bottom or series of wells for the interior of the converter.

As best shown in Figure 1, the wind box or pipe defined by the bottom plate 32 is connected with an air blast supply line 37 through swivelly connected elbows 38 and 39. These swivel elbow connections permit tilting of the converter in either direction. A slide type valve 40 can be provided in the supply line to control the blast feed to the wind box and further control can be obtained by means of individual valves.

In the modification shown in Figure 6, the converters such as 17 can be provided with a side mounted wind box 41. This wind box 41 communicates through tuyères 42 with the interior of the converter along a side wall of the converter. In some processes a side blow may be preferable to a bottom blow although a bottom blow process is usually faster.

The side wind box 41 can be connected with a blast supply line through swivelly connected elbows 44 and 45 permitting tilting of the converter as described in Figure 1.

In the modification shown in Figure 4 the converters such as the converter 17 can have the bottom lining 46 thereof sloping toward the discharge end of the converter. This sloping bottom 46 may be preferable in some instances over the stepped bottom shown in Figure 1. The lining 46 has the usual tuyère openings 47 therethrough communicating with the wind box 32.

In the further modification shown in Figure 7, the converters such as the converter 17 can have the bottom lining 48 thereof forming a plurality of saucer-like depressions 49, 50 and 51. These depressions or sumps receive the metal in succession, and in each sump or series of sumps, the metal can be treated to remove a particular undesired impurity or impurities. Thus in the sump 49 the metal can be treated for the removal of silicon. As the metal flows into the next sump 50, the air blast may be regulated to remove manganese from the metal. Then as the thus-treated metal flows into the third sump 51, the air blast can be regulated to remove or reduce the carbon content.

Any number of sumps, such as 49, 50 and 51 can be arranged for the treatment of the flowing metal to remove undesired ingredients and are so regulated as to size and capacity that the metal will remain in a particular sump for a sufficient length of time and be treated by a sufficient amount of air to remove the particular undesired impurity, or impurities.

From the above description it should be understood that the modification of the invention disclosed in Figures 1 to 3 with the converters shown in these figures, or in Figures 4, 6 and 7 makes possible a continuous method of refining metals.

For example, scrap metals such as iron or steel scraps or a ferrous ore can be melted in the furnace 10. This furnace can be of the continuous operating type that is charged from the top thereof with scrap or ore, coke, and limestone or other slag forming material and the like. The molten metal is tapped out of the bottom of the furnace and flows through the spout 12 into the desulphurizing ladle. As the metal flows through the ladle 13 it is treated with desulphurizing agents such as sodium hydroxide, soda ash, and the like. The sulphur slag is skimmed off of the top of the ladle but the metal is allowed to continually flow through the ladle. The spouts such as 14 and 15 will only discharge metal that has flowed to the bottom of the ladle. This arrangement prevents a top flow of metal across the ladle with an insufficient contact with the desulphurizing agents.

One of the spouts such as the spout 15 is plugged to prevent discharge therethrough. The converter under the unplugged spout 14 is then tilted on its side as shown in dotted lines in Figure 3. Metal will flow from the spout 14 into the inner wing 20a of the converter 17 and will flow along the belly of the converter. When a sufficient amount of metal is forced into the converter, the air blast is turned on to blow jets of air through the tuyères and the rocking mechanism is actuated to move the converter into any desired position such as the upright position shown in solid lines in Figure 3.

The degree of inclination and the size of the discharge port 22 of the converter is regulated so that the metal will flow through the converter at a controlled rate of speed. The refined metal is then discharged into the ladle 23. The ladle 23 can be used to charge a further treating furnace for the metal such as an open hearth furnace or an electric furnace. Alternatively the metal can be directly cast into pigs or formed castings, or Bessemer ingots.

When the ladle 23 is filled, the spout 14 is plugged, the converter 18 may be tilted on its side and the plug removed from the spout 15 to fill the converter 18. The process is then repeated with the converter 18.

The parallel arrangement of converters makes possible a shifting from one converter to the other without stopping the metal flow from the furnace thereby permitting transfer of receiving ladles, cleaning and repairing of a converter and the like operations without stopping the process.

During the converter blow, sparks and hot gases are propelled from the top of the converter. It may thus be desirable to cover the apparatus with a hood such as 52 shown in Figure 3. This hood 52 can communicate with a stack such as 53 and can have hinged side walls 54 and 55. These side walls can be raised to permit access to the apparatus.

In the modification shown in Figure 5 the metal is poured directly from the melting furnace 10 into a converter. For this purpose a tapping spout 56 having two branches 56a and 56b can be provided at the bottom of the furnace 10. The branch 56a registers with the converter 18 while the spout 56b registers with the converter 17. The converter structures are identical with the structures described above, and identical parts have been marked with the same reference numerals.

In operation of the apparatus shown in Figure 5 the furnace is tapped and one of the branches 56a or 56b of the discharge spout 56 is plugged. The metal then flows through the unplugged branch into one of the converters where it is treated until the ladle 23 communicating with that converter is filled. The other branch of the spout is then opened and the metal is allowed to flow into the other converter. The alternative use of the converters makes possible a continuous process.

It should be understood that both converters or series of converters can be used simultaneously if it should be so desired. Likewise, it is possible to employ but a single converter, in which case the tap hole of the metal furnace could be closed from time to time as necessary, as when the converter is off, or while changing ladles. The converter could blow continuously, if necessary, and while changing ladles, metal could momentarily be run into the ground or other container. A plurality of converters is not necessary, although the carrying out of a continuous process is facilitated if at least two converters are used.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. Refining apparatus for metals comprising a longitudinally elongated open-topped member having an inlet at one end and a discharge at the other end thereof, a refractory lining in said member, a plurality of tuyères communicating with the interior of the member in spaced relation from the top thereof, a wind box carried by the member for supplying air to the tuyères, means for tilting said member transversely of its length and a jack for raising and lowering one end of the member to place the member at a desired incline.

2. Apparatus for refining metals which comprises a longitudinally elongated open-topped converter, means for tilting the same longitudinally and laterally, said converter having a transverse inlet passageway at one end adapted to receive molten metal when said converter is tilted laterally, and a discharge outlet at the other end thereof, and means communicating with the lower portion of the converter between the inlet and outlet for blowing a fluid into the converter.

3. Apparatus for refining metals which comprises an elongated open-topped converter, means for tilting said converter longitudinally and laterally, and means for blowing a fluid into said converter below the top thereof.

4. Apparatus for refining metals which comprises an elongated constrictedly open-topped converter, means for tilting said converter longitudinally and laterally, means defining an inlet passage at one end of said converter adapted to receive molten metal, said converter having a discharge outlet at the other end thereof, and a wind box on said converter communicating with the lower portion thereof.

5. Apparatus for refining metals which comprises a source of molten metal, an elongated open-topped converter adapted to accommodate a stream of molten metal and having one end adjacent said source, wings defining a transverse inlet opening at the end of said converter adjacent said source, said converter having a discharge opening at the other end thereof, a wind box on said converter adapted to blow air through said stream of flowing metal, and means for tilting said converter to regulate the amount of air blown through said stream of molten metal.

6. Apparatus for refining metals which comprises a longitudinally elongated open-topped receptacle having a pear-shaped cross section, a pair of rockers supporting said receptacle, means for tilting said receptacle longitudinally, a wind box on said receptacle, tuyères joining the interior of the wind box with the interior of the receptacle, and means for actuating at least one of said rockers to tilt the receptacle laterally.

7. A Bessemer converter comprising an elongated receptacle having converging side walls defining an elongated restricted open-top for the receptacle, transverse wings at one end of said receptacle communicating therewith for defining an inlet passageway thereto, a plurality of tuyère openings along the bottom of said receptacle, a wind box communicating with said tuyère openings, and means for tilting said receptacle both laterally and longitudinally.

8. Refining apparatus for metals comprising a longitudinally elongated open-topped member having an inlet at one end and a discharge outlet at the other end thereof, a refractory lining in said member, a plurality of tuyères communicating with the interior of the member in spaced relation from the top thereof, a wind box carried by the member for supplying air to the tuyères, a pair of transverse rockers supporting said member, means for actuating at least one of said rockers to tilt the member laterally, and means for tilting said member longitudinally.

9. Refining apparatus for metals comprising a longitudinally elongated open-topped member having an inlet at one end and a discharge outlet at the other end thereof, a refractory lining in said member, a plurality of depressions in said lining along the bottom of the member defining successive sumps along the length of the member, tuyères communicating with said sumps, a wind box for supplying air to the tuyères, and means for tilting said member longitudinally.

10. Apparatus for continuously refining metals which comprises a melting furnace, a pair of spaced parallel elongated converters in front of said furnace, each of said converters defining an elongated open-topped trough, means for tilting said converters longitudinally, means for directing molten metal from the furnace into said converters at the ends thereof adjacent the furnace, receptacles for receiving metal from the other ends of the converters, and means for blowing air through the metal as it flows through the converters.

PAUL W. DILLON.